United States Patent Office 3,505,299
Patented Apr. 7, 1970

3,505,299
RECOVERY OF FINELY DIVIDED ORGANIC PARTICLES FROM A COLLOIDAL SOLUTION THEREOF
Chester L. Baker, Narberth, and John Frankle Austin, Philadelphia, Pa., assignors to Philadelphia Quartz Company, Philadelphia, Pa., a corporation of Pennsylvania
No Drawing. Continuation-in-part of application Ser. No. 768,823, Oct. 20, 1958. This application June 25, 1965, Ser. No. 467,114
Int. Cl. C08c 1/16; C08f 47/03; C08l 1/07
U.S. Cl. 260—89.5                                   2 Claims

ABSTRACT OF THE DISCLOSURE

Finely divided colloidal organic compounds are separated from the original solution by first adding a clustering agent to form a protocoacervate of the colloidal particles and then adding an isolubilizing agent to cause the clustered colloidal organic material to separate from the solution in finely divided submicron form.

CROSS-REFERENCE TO RELATED APPLICATIONS

This application is a continuation-in-part of our copending application Ser. No. 768,823 filed on Oct. 20, 1958 and now U.S. Patent 3,208,823; Ser. No. 292,936 filed on June 11, 1952 and now abandoned; and Ser. No. 763,444 filed on July 24, 1947 and now abandoned.

In U.S. Patents 3,208,823, 2,948,701, 2,958,578 and 2,972,594 we have described the preparation of finely divided silica and metallic silicates by the application of the principle of coacervation. This is not simply explained according to present theories of physical and colloidal chemistry; it involves the structure of the solvent, the character of the colloidal molecule or micelle, the effect on the colloid of adding a coacervating agent, and the effect of adding the precipitating agent. In our co-pending application, "Coated Surfaces," Ser. No. 467,086, filed June 25, 1965, now U.S. Patent 3,301,701, we have outlined the qualitative theory for aqueous siliceous systems. Just as in the aqueous colloidal solution of silica micelles in which the aggregate or polymer of silica is stabilized and screened by OH ions and Na ions, organic polymers may also be screened in either aqueous or organic systems forming a coacervate which, as Langmuir (J. Chem. Phip. 6, 873–896, 1938) has shown, may separate simultaneously as critical phenomena throughout the solution so that numerous minute particles of colloidal material are separated. These may then be caused to separate while still protected by the coacervating agent and thus separate as solid particles which do not run together and remain as very uniform, very fine particles which have many uses as pigments, fillers, etc. Thus we may take an organic material which forms colloidal solutions, such as rubber or gelatin, or rosin or cellulose acetate, or methyl methacrylate, etc. We bring them into solution by a solvent which in most of the following examples is acetone, but in the case of gelatin is water and may be any applicable solvent. In the case of gelatin, particularly, the analogy to sodium silicate is very close since the pH of the water solution controls the precipitation of protein. The colloidal materials may be coacervated just as colloidal silica may be coacervated by destabilizing the colloids through interference with the solvating liquid which, in these cases, as indicated above, may be acetone, water or methyl alcohol, etc. depending on the system.

This coacervated somewhat destabilized colloid may be completely destabilized by the addition of an insolubilizing agent. In the case of gelatin, sodium sulfate solution affects the protein throwing it out of solution. This is a well-known reaction with protein. Rubber dissolved in benzene coacervated with acetone may be precipitated with acetic acid. Again, the insolubilizing agent is well-known. It is presumably a reaction between the acid and the protein which is present to help stabilize the rubber. In the case of rubber latex, it is of course well-known that the stability of the latex depends on protein attached to the surface of the colloidal material and that this protein reacts with acid, etc. The methyl methacrylate and cellulose acetate solvated by acetone and coacervated by methyl alcohol react with water to cause a precipitation. As we understand it, the water replaces the solvating acetone forming an insoluble product. Thus, basically, it appears that the reaction occurs at the particle surface changing the electrical attraction and causing a shift in the electronic configuration. In non-aqueous systems, electrical changes are of a much lesser degree than in aqueous systems but they are of relatively larger importance with respect to the solvation occurring in the non-aqueous system.

In each case the insolubilizing agent brings about the formation of a precipitate which has essentially the structure of the original micelle. We believe that this occurs in the case not only of silica but also gelatin, rosin, rubber, methyl methacrylate, cellulose acetate and other organic compounds which may form colloidal solutions. We have thus applied our equilibrium precipitation process to organic solvophyllic colloids.

The following examples demonstrate the broad application of this clustering or coacervation process to colloidal organic materials. The coacervating and precipitating materials applicable to a given colloidal organic solution are known in the related art and such knowledge merely requires to be combined as we have outlined above and in the applications and patents mentioned.

Example 1

Sodium sulfate converts a solution of gelatin into a gummy, gelatinous precipitate. If, however, the gelatin is first brought to incipient clustering (i.e., a protocoacervate) then the gelatin precipitated by sodium sulfate is finely divided and easily filterable.

10 grams of gelatin were dissolved in 90 grams of water at 35° C. 100 grams of methyl alcohol were added and a very faint opalescence was observed at equilibrium. Then 3.5 grams of sodium sulfate were added in a few seconds with vigorous agitation. 7 grams of very finely divided free-flowing soluble gelatin was obtained on filtration and quick rinsing.

The uniform fine particle size was especially valuable in the manufacture of gelatin sponge, and cosmetics and for incorporation in ice cream.

Example 2

Rubber or rubber latex dissolved in an organic liquid, such as benzene, may be caused to cluster or coacervate by the use of a liquid such as acetone or methyl alcohol. Fixation may then be achieved with an organic acid, such as acetic acid.

A supernatant solution of benzene containing 4.5% of rubber was formed by agitating an excess of a rubber latex (experimental latex X-275) (formulation RO-99 45% solids from Dow Chemical Company) in benzene. One volume of methyl alcohol mixed with 3 volumes of the benzene solution formed a protocoacervate or activated solution (protocoacervate or solution at incipient coacervation). On addition of acetic acid, a quantity of finely divided particles precipitated from the solution. When no clustering or coacervating agent was present, a gummy precipitate was obtained, instead.

The finely divided rubber particles were used to form rapidly soluble adhesives with benzene and in the formulation of rubber batches for molding.

Example 3

A synthetic resin, methyl methacrylate, was dispersed in acetone and treated with a little water. A gummy, gelatinous mass was produced which on air drying became friable fibers. However, if a clustering agent was added before the water, the product was a non-gelatinous, non-gummy, curdy mass which set up in the same manner as a silicate protocoacervate. When air-dried, the product was easily friable lumps of finely divided particles. For instance, 10 parts of a 10% solution of methyl methacrylate in acetone was treated with 7 parts of methyl alcohol as a clustering agent for this system since it has a greater affinity for acetone than has methyl methacrylate. 3 parts of water were added as a unit with agitation. The mass then set up as a mass of curds. These fine curds, when dried, were especially useful in the rapid preparation of emulsions and coatings and as molding powders.

Example 4

In another case, 10 parts by volume of a solution of 15% cellulose acetate in acetone formed a gummy, gelatinous precipitate when treated with water. Lumps of long, friable fibers formed on drying. If, however, 17 parts by volume of methyl alcohol were added as a clustering agent, before the water was added as insolubilizing agent, a non-gelatinous, curdy floc of separate particles was formed which, on drying, took the form of short, separate fibers. These fibers made very homogeneous injection moldings as well as rapidly dissolving to form homogeneous solutions for rayon manufacture and casting films.

In carrying out these procedures it is not necessary that the clustering agent be strictly compatible with the insolubilizing agent but only that any precipitate formed by mixing these two agents be more soluble than the precipitate formed upon mixing the colloidal coacervate solution with the insolubilizing agent. Of course, in some cases it is possible to use a mixture of clustering agents as well as a mixture of precipitating agents. Unfortunately, it is impossible to set out specific ranges of concentration and temperatures which will apply to all organic colloidal solutions, all clustering agents and all insolubilizing agents, but with the aid of simple tests and the specific examples which have been given it is believed that those skilled in the art will have no difficulties in adopting our process to any organic compound which can be placed in colloidal solution and any coacervating agent or insolubilizing agent which is applicable in a given process.

The words "methyl methacrylate" in the foregoing description have been used as an abbreviation for "polymeric methyl methacrylate," in accordance with common usage in this art.

While we have described what we consider to be the more advantageous embodiments of our process, it is evident of course that various modifications can be made in the specific procedures which have been described without departing from the purview of this invention. Obviously, mixed clustering agents and mixed insolubilizing agents may be employed as long as they are compatible to the extent that, on mixing them, no precipitate is formed which will interfere with the separation of the organic powder. Any reasonable temperatures may be employed with proper regulation of the other variables.

As noted earlier, this application is a continuation-in-part of our co-pending application Ser. No. 768,823 filed on Oct. 20, 1958 and now U.S. Patent 3,208,823; Ser. No. 292,936 filed on June 11, 1952 and now abandoned; and Ser. No. 763,444 filed on July 24, 1947 and now abandoned. In these prior applications we described methods of obtaining finely divided solids by treating various inorganic colloidal solutions with coacervating agents and insolubilizing agents. In the present application we define more specifically and in greater detail the conditions required to produce finely divided organic powders. It is believed and intended that all of the pertinent disclosures of the above applications are either specifically included or incorporated by reference in the present application.

What is claimed is:
1. The process which comprises:
 (1) bringing together
  (a) a solution of an organic solvophyllic polymer colloid,
  (b) a clustering agent which is adapted to cause said colloid to cluster, and
  (c) an insolubilizing agent which is adapted to precipitate said colloid,
 (2) mixing said clustering agent with said solution not later than said insolubilizing agent is mixed therewith,
 (3) completing the mixing in of the insolubilizing agent before the appearance of any substantial amount of irreversible precipitate, and
 (4) recovering the resulting precipitate of finely divided organic colloids.

2. A process according to claim 1 wherein said organic solvophyllic polymer colloid is selected from the group consisting of rubber, gelatin, rosin, cellulose acetate, and polymeric methyl methacrylate.

References Cited

UNITED STATES PATENTS

| | | | |
|---|---|---|---|
| 1,392,849 | 10/1921 | Plauson | 106—159 |
| 2,481,876 | 9/1949 | Rhines | 260—23.7 |
| 3,232,915 | 2/1966 | Bush et al. | 260—89.5 |
| 3,244,679 | 4/1966 | Schroder et al. | 260—86.1 |
| 2,691,008 | 10/1954 | Grim | 260—93.5 |
| 2,948,701 | 8/1960 | Baker | 260—41.5 |
| 2,958,578 | 11/1960 | Baker | 23—110 |
| 2,972,594 | 2/1961 | Baker | 260—41.5 |
| 3,208,823 | 9/1965 | Baker | 23—182 |
| 3,258,453 | 6/1966 | Chi | 260—82.1 |
| 3,297,612 | 1/1967 | Lee et al. | 260—29.6 |

OTHER REFERENCES

M. B. Horn, Acrylic Resins, Reinhold Publ. Co., New York (1960), pp. 84–90.

C. E. Schildknecht, Polymer Processes, Interscience, New York (1956), pp. 102–109.

F. W. Billmeyer, Textbook of Polymer Chemistry, Interscience (1957), p. 250.

F. Bueche, Physical Properties of Polymers, Interscience (1962), pp. 23–24.

JOSEPH L. SCHOFER, Primary Examiner

J. C. HAIGHT, Assistant Examiner

U.S. Cl. X.R.

260—97, 118, 227, 709